(12) United States Patent
Fanning et al.

(10) Patent No.: US 8,752,035 B2
(45) Date of Patent: Jun. 10, 2014

(54) TRANSFORMING DYNAMIC SOURCE CODE BASED ON SEMANTIC ANALYSIS

(75) Inventors: Michael C. Fanning, Redmond, WA (US); Frederico A. Mameri, Seattle, WA (US); Zachary A. Nation, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/149,676

(22) Filed: May 31, 2011

(65) Prior Publication Data

US 2012/0311546 A1    Dec. 6, 2012

(51) Int. Cl.
G06F 9/45    (2006.01)

(52) U.S. Cl.
USPC ............................ 717/154; 717/151; 717/141

(58) Field of Classification Search
USPC .................................. 717/141–144, 151–161
See application file for complete search history.

(56) References Cited

U.S. PATENT DOCUMENTS

| | | | |
|---|---|---|---|
| 5,535,391 A | 7/1996 | Hejlsberg et al. | |
| 5,845,118 A | 12/1998 | Gheith | |
| 5,923,882 A | 7/1999 | Ho | |
| 6,175,948 B1 * | 1/2001 | Miller et al. | 716/105 |
| 6,289,506 B1 | 9/2001 | Kwong | |
| 6,292,938 B1 * | 9/2001 | Sarkar et al. | 717/138 |
| 6,804,682 B1 * | 10/2004 | Kemper et al. | 1/1 |
| 6,807,548 B1 * | 10/2004 | Kemper | 1/1 |
| 6,895,578 B1 | 5/2005 | Kolawa | |
| 6,973,646 B1 | 12/2005 | Bordewekar | |
| 7,370,318 B1 * | 5/2008 | Howe et al. | 717/110 |
| 7,434,209 B2 | 10/2008 | Brown | |
| 7,451,435 B2 | 11/2008 | Hunt et al. | |
| 7,493,610 B1 | 2/2009 | Onodera | |
| 7,530,056 B1 | 5/2009 | Yaari | |
| 7,650,600 B2 | 1/2010 | King | |
| 7,730,448 B2 * | 6/2010 | Meijer et al. | 717/106 |
| 8,060,868 B2 * | 11/2011 | Meijer et al. | 717/141 |
| 8,239,847 B2 * | 8/2012 | Yu et al. | 717/149 |
| 8,473,911 B1 * | 6/2013 | Baxter | 717/123 |
| 8,555,250 B2 * | 10/2013 | Fanning et al. | 717/120 |
| 2002/0162091 A1 | 10/2002 | Crocker et al. | |
| 2004/0049763 A1 | 3/2004 | Bloch et al. | |
| 2004/0117778 A1 | 6/2004 | Sehr et al. | |
| 2006/0048097 A1 * | 3/2006 | Doshi | 717/120 |
| 2007/0038978 A1 | 2/2007 | Meijer et al. | |
| 2007/0074188 A1 | 3/2007 | Huang | |

(Continued)

OTHER PUBLICATIONS

Chu-Carroll and Pollock, "Compiling and Optimizing Dynamic Parallel Programs", Jun. 24, 2005, pp. 3-4, 7, and 11-12.*

(Continued)

*Primary Examiner* — Don Wong
*Assistant Examiner* — Marina Lee
(74) *Attorney, Agent, or Firm* — Kevin Sullivan; Brian Haslam; Micky Minhas

(57) ABSTRACT

Transforming dynamic code. The method includes obtaining one or more first data structures defining constructs in a body of dynamic language source code. From the one or more first data structures, identifier information is extracted for one or more of the defined constructs. Knowledge about the constructs is augmented. Using the identifier information and augmented knowledge, metadata is generated about the body of the dynamic language source code. The generated metadata is represented as a symbol table. Using the symbol table, the body of dynamic language source code is transformed.

16 Claims, 7 Drawing Sheets

(56) References Cited

U.S. PATENT DOCUMENTS

| | | | |
|---|---|---|---|
| 2007/0078823 A1* | 4/2007 | Ravindran et al. | 707/3 |
| 2007/0169036 A1 | 7/2007 | Garner et al. | |
| 2007/0220480 A1 | 9/2007 | Waldman et al. | |
| 2007/0220486 A1 | 9/2007 | Lammel | |
| 2007/0226708 A1 | 9/2007 | Varma | |
| 2007/0234288 A1* | 10/2007 | Lindsey et al. | 717/117 |
| 2008/0066063 A1 | 3/2008 | Pouliot et al. | |
| 2008/0162885 A1 | 7/2008 | Wang et al. | |
| 2008/0235660 A1 | 9/2008 | Chapman | |
| 2008/0295083 A1 | 11/2008 | Meijer et al. | |
| 2008/0320440 A1* | 12/2008 | Meijer et al. | 717/108 |
| 2009/0024986 A1 | 1/2009 | Meijer | |
| 2009/0077543 A1* | 3/2009 | Siskind et al. | 717/136 |
| 2009/0313604 A1 | 12/2009 | Miceli | |
| 2009/0319995 A1 | 12/2009 | Gawor | |
| 2010/0083233 A1 | 4/2010 | Vanoverberghe | |
| 2010/0106949 A1* | 4/2010 | Komatsu et al. | 712/226 |
| 2010/0218173 A1 | 8/2010 | Aharoni et al. | |
| 2010/0257404 A1 | 10/2010 | Singh et al. | |
| 2010/0299658 A1 | 11/2010 | Ng | |
| 2011/0138361 A1* | 6/2011 | McEntee et al. | 717/125 |
| 2011/0138373 A1* | 6/2011 | Lane et al. | 717/157 |
| 2011/0154122 A1* | 6/2011 | Li et al. | 714/38.1 |
| 2011/0202902 A1 | 8/2011 | Whelan | |
| 2011/0271260 A1 | 11/2011 | Kwon et al. | |
| 2012/0011493 A1 | 1/2012 | Singh et al. | |
| 2012/0192169 A1* | 7/2012 | Li et al. | 717/161 |
| 2012/0311533 A1* | 12/2012 | Fanning et al. | 717/111 |
| 2012/0311535 A1* | 12/2012 | Fanning et al. | 717/123 |
| 2012/0311536 A1* | 12/2012 | Fanning et al. | 717/123 |
| 2012/0311546 A1* | 12/2012 | Fanning et al. | 717/136 |

OTHER PUBLICATIONS

Chu-Carroll and Pollock (prior art date). See highlighted portion.*
Google search results "closure conversion dynamic programming language".*
ip.com search results "break a block of source code into multiple smaller blocks of code".*
Muchnick, Steven S, "Advanced compiler design and implementation", Morgan Kaufmann Publishers, Aug. 19, 1997, pp. 169 and 371-372.*
Aho et al. "Code Generation Using Tree Matching and Dynamic Programming", Journal ACM Transaction, 1989, retrieved from <http://delivery.acm.org/10.1145/80000/75700/p491-aho.pdf?ip=151.207.250.71&id=75700&acc=PUBLIC&key=986B26D8D17D60C8AAC6AC1B60173C4E&CFID=388800748&CFTOKEN=45549369&__acm__=1387004132_25f3942825923c937e3f3bad1e7a7d4c>, 26 pages.*
Cox, A. et al., "Lexical Source-Code Transformation," Published 2004, Faculty of Computer Science, Dalhousie University, Halifax, Nova Scotia, Canada.
Louden, K., "Compiler Construction: Principles and Practice," Retrieved Mar. 11, 2011, http://www.cs.aue.auc.dk/~akbar/2006/complierconst06.html.
Stackoverflow, "A Language for Semantic Analysis?" Retrieved Mar. 11, 2011, http://stackoverflow.com/questions/1417120/a-language-for-semantic-analysis.
Crockford, D., "JSMin—The JavaScript Minifier," Retrieved Mar. 11, 2011, http://www.crockford.com/javascript/jsmin.html.
Dolby, J., "Using Static Analysis for IDE's for Dynamic Languages," Available at least as early as Oct. 14, 2005, http://www.eclipse.org/org/langsymp/JulianDolby_paper.pdf.
Biggar, P., et al., "Static analysis of dynamic scripting languages," Available at least as early as Mar. 15, 2011, http://www.paulbiggar.com/research/wip-optimizer.pdf.
Furr, M., et al., "Profile-Guided Static Typing for Dynamic Scripting Languages", Published Apr. 2009.
Misek, J., et al., "Mapping of Dynamic Language Constructs into Static Abstract Syntax Trees," 9th IEEE/ACIS International Conference on Computer and Information Science, Aug. 18-20, 2010.
Abadi, M., et al., "Dynamic Typing in a Statically Typed Language", Published Apr. 1991, http://www.hpl.hp.com/techreports/Compaq-DEC/SRC-RR-47.pdf.
Misek., J., et al., "Syntactic and Semantic Prediction in Dynamic Languages," Published 2009, http://ulita.ms.mff.cuni.cz/~zavoral/pub/09-SERA-Intellisense.pdf (The month of Publication is irrelevant since the year of Publication is clearly prior to the filing of the Application).
Aycock, "Aggressive Type Inference," Published 2009, http://www.python.org/workshops/2000-01/proceedings/papers/aycock/aycock.html (The month of Publication is irrelevant since the year of Publication is clearly prior to the filing of the Application).
Anderson, C., et al., "Towards Type Inference for JavaScript", Published 2009, http://pubs.doc.ic.ac.uk/typeinferenceforjavascript-ecoop/typeinferenceforjavascript-ecoop.pdf (The month of Publication is irrelevant since the year of Publication is clearly prior to the filing of the Application).
Foster, "Data Flow Analysis 1—15-411 Compiler Design", Alex Aiken, Oct. 5, 2004, pp. 44.
Paul Carson, "Source code models and their use in assessing software quality", University of Strathclyde, Glasgow, UK, Nov. 2007, pp. 10.
Alejandro Russo, "Dynamic vs. Static Flow-Sensitive Security Analysis", Jul. 2010, Chalmers University of Technology, pp. 187-199, <http://ieeexplore.ieee.org/stamp/stamp.jsp?tp=arnumber=5552646&tag=1>.
Richard Fairley, "Tutorial: Static Analysis and Dynamic Testing of Computer Software", Apr. 1978, Colorado State University, pp. 14-23, <http://ieeexplore.ieee.org/stamp/stamp.jsp?tp=&arnumber=1646907>.
Davide Balzarotti, "Saner: Composing Static and Dynamic Analysis to Validate Sanitization in Web Applications", May 2008, University of California, pp. 387-401, <http://ieeexplore.ieee.org/stamp/stamp.jsp?tp=&arnumber=4531166>.
Nokia Corporation, "QT Creator: Using the Editor," Available at least as early as Mar. 11, 2011, http://doc.qt.nokia.com/qtcreator-2.1-snapshot/creator-editor-using.html.
NetBeans, "Code Assistance in the NetBeans IDE Java Editor: A Reference Guide," Available at least as early as Mar. 11, 2011, http://netbeans.org/kb/docs/java/editor-codereference.html.
JetBrains, "Reshaper 5: Coding Assistance," Available at least as early as Mar. 11, 2011, http://www.jetbrains.com/resharper/features/coding_assistance.html.
Wolfram, "Mathematica Editor Advantages," Available at least as early as Mar. 11, 2011, http://reference.wolfram.com/workbench/index.jsp?topic=/com.wolfram.eclipse.help/html/tasks/why.html.
Silvaco, "Source Edit: Source Code Editor Window", Available as early as Mar. 11, 2011, http://www.silvaco.com/examples/silos/section1/example16/.
ReSharper, "Coding Assistance", Jan. 8, 2009, pp. 1-5.
U.S. Appl. No. 13/149,651, Feb. 22, 2013, Office Action.
U.S. Appl. No. 13/149,651, Jun. 5, 2013, Notice of Allowance.
U.S. Appl. No. 13/149,665, Jan. 30, 2013, Office Action.
U.S. Appl. No. 13/149,665, May 23, 2013, Office Action.
U.S. Appl. No. 13/149,665, Nov. 21, 2013, Notice of Allowance.
U.S. Appl. No. 13/149,693, Sep. 11, 2013, Office Action.
Office Action dated Mar. 12, 2014 cited in U.S. Appl. No. 13/149,693.

* cited by examiner

TRANSFORMING DYNAMIC SOURCE CODE BASED ON SEMANTIC ANALYSIS

BACKGROUND

Background and Relevant Art

Computers and computing systems have affected nearly every aspect of modern living. Computers are generally involved in work, recreation, healthcare, transportation, entertainment, household management, etc.

Computers are typically controlled using computer software. The computer software includes executable instructions that can be executed by one or more processors to cause the computer to perform various functions. Computer software may be created using source code created in a programming language. Code may be categorized in several different ways. One distinctive method of categorizing computer code is categorizing it as either static or dynamic.

Static code can typically be easily analyzed before runtime as the code typically is defined before runtime and does not change at runtime, the type system is well defined before runtime and does not change at runtime, and types within the type system are defined before runtime and do not change at runtime. Compilers, before runtime, can perform static analysis on static code and provide information to developers regarding characteristics of the static code or potential problems with a body of code.

Alternatively, some computer code may be classified as dynamic. In dynamic code, new code may be added at runtime. Additionally, static code type systems are not well defined before runtime. Further still, types within a static code type system can change at runtime.

Minifiers and/or code rewriters for dynamic languages today are currently limited by technical approach. Specifically, they do not have sufficient semantic understanding of the manipulated code in order to perform some kinds of sophisticated and/or useful transformations.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein comprises a method practiced in a computing environment. The method includes acts for transforming dynamic code. The method includes obtaining one or more first data structures defining constructs in a body of dynamic language source code. From the one or more first data structures, identifier information is extracted for one or more of the defined constructs. Knowledge about the constructs is augmented. Using the identifier information and augmented knowledge, metadata is generated about the body of the dynamic language source code. The generated metadata is represented as a symbol table. Using the symbol table, the body of dynamic language source code is transformed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments may include functionality for elevating the capabilities of a dynamic language transforming platform by integrating a deep semantic analysis of code that is being operated upon. This semantic analysis can then be used to transform dynamic code. For example, the semantic analysis can be used to perform one or more of obfuscation, minification, optimization, code partitioning, lambda lifting, translation into a different computer language, or other transformations.

Deep semantic analysis of code can be done using a hierarchical symbol table. A hierarchical symbol table that represents a dynamic language execution environment is constructed from a set of executable source code inputs, non-executing 'reference' files and augmenting annotations that model type and other runtime details. A multi-pass analysis is applied to the resulting abstract syntax trees (ASTs) and supporting symbol table, during which the ASTs are potentially transformed and/or optimized and/or new source code is emitted.

Embodiments may provide an extensibility model to support runtime resolution of symbols, and some kinds of code execution. This allows for a broader range of transformations where existing tools are required to limit operation.

Embodiments may provide a general platform for transforming, as opposed to being a tool that is specifically targeted to one or more scenarios, such as minification, obfuscation, etc.

Embodiments may provide a mechanism to associate transformed code with original source location details. The result is a map file for emitted code that allows tools such as debuggers to operate against original source in scenarios where that is preferable to examining the transformed source.

Figure 1:
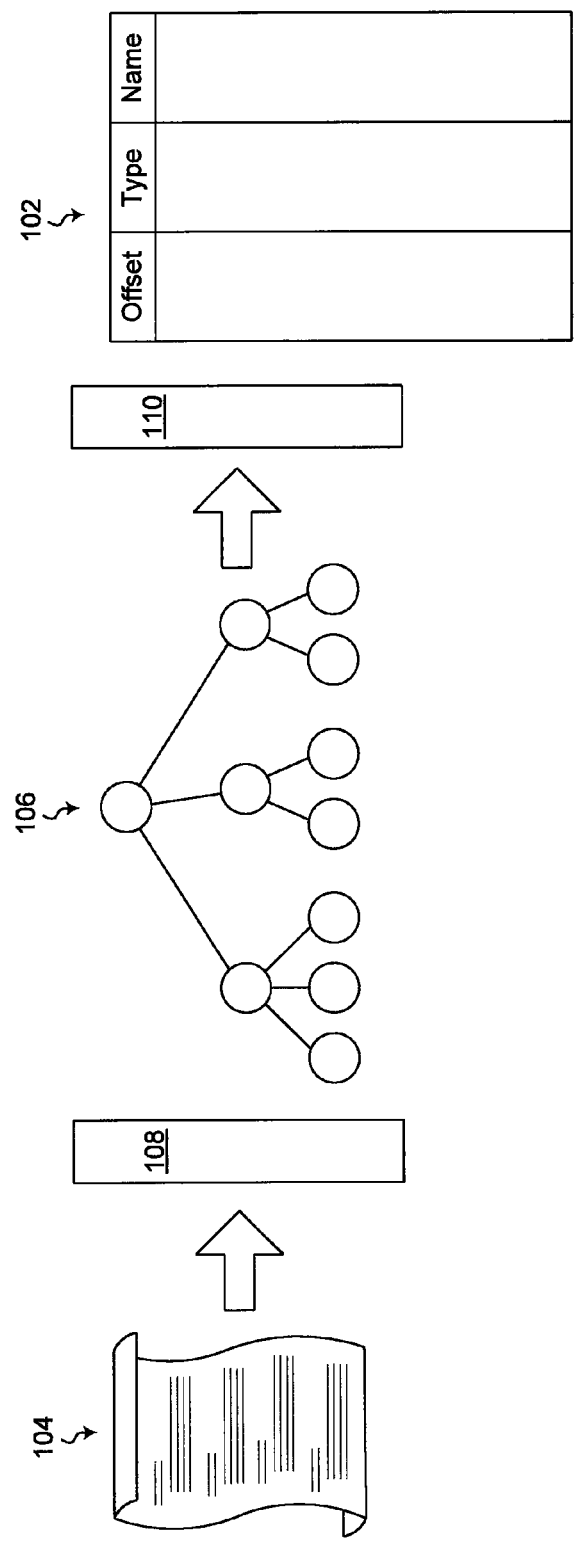
FIG. 1 illustrates transformation of a body of source code to an abstract syntax tree and use of the abstract syntax tree to create a symbol table.

The following now illustrates details regarding creation of a symbol table that can be used for transformations. Transformations, using the symbol table, will be discussed later herein. Referring now to FIG. 1, in some embodiments, a symbol table 102 is constructed from implied and explicit inputs (such as, among other things, source files of a body of code 104) of a dynamic language. A symbol table data structure correlates identifiers in a program's source code with augmented information relating to its declaration or appearance in the source code. The symbol table may include, for example, correlation between an identifier and information related to type, scope level, location, etc.

In some embodiments, symbols and symbol references are read from persisted data and/or discovered and/or inferred from a multi-pass traversal of an AST representation 106 of a body of program code 104. While ASTs are referred to in the examples below, it should be appreciated that other types of syntax trees may be used additionally or alternatively. A symbol table 102 including mapping between source code offsets and symbolic references is constructed. This mapping can be used to implement various editor features. For example, such features may include one or more of 'go to symbol definition', 'find all references to this symbol', 'rename this variable', etc.

Illustrating now additional detail, some embodiments described herein include methods and/or apparatus to construct and understand a rich set of symbols & symbolic references, by combining several different techniques into a single system. For example, as illustrated in FIG. 1, a first technique uses one or more parsers 108 to create ASTs 106 from source code 104. The one or more parsers can construct symbol tables 102 from the AST 106 input. A second technique that may be used, in some embodiments with the first technique, includes reading and/or hydrating static, literal descriptions of symbols directly. In particular, if symbols can be determined by static analysis or inferences, this technique could be used to resolve some symbols. A third technique that could be used with other techniques includes using type inferencing code that models runtime type resolution. This could be augmented by static annotations that signify type information and/or declarations for variables. A fourth technique that could be used with other techniques includes using code and/or extensibility points that model symbol table manipulation based on an understanding of runtime behaviors of both a platform itself and/or calls to specific APIs. A fifth technique that could be used with other techniques includes defining and/or enforcing coding guidelines provided to developers that help maximize discoverability of relevant information. In some embodiments, enforcing guidelines may be facilitated by using coding tools to drive enforcement of the coding guidelines.

Figure 2:
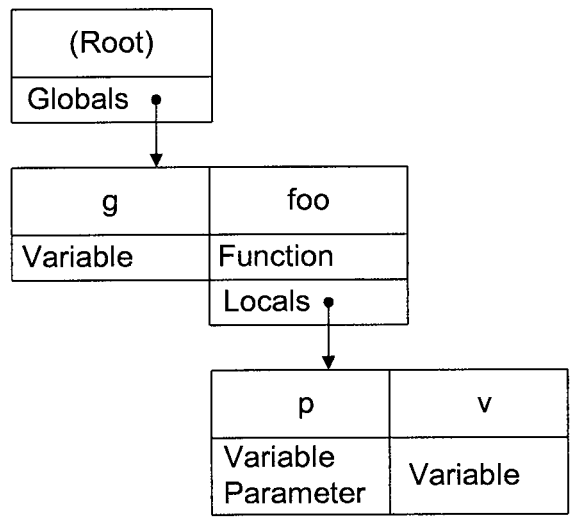
FIG. 2 illustrates an example symbol table.
Figure 3:
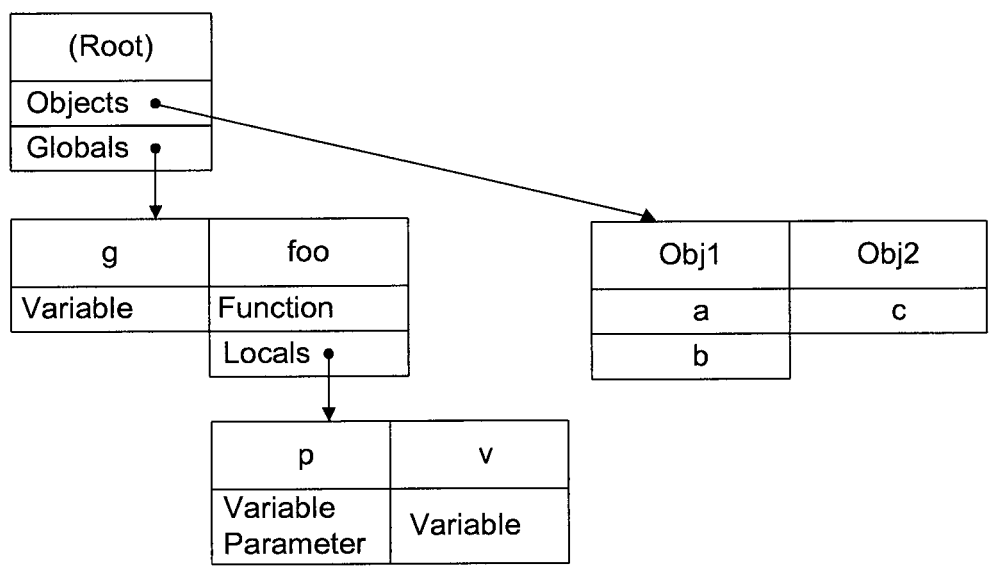
FIG. 3 illustrates another example symbol table.

FIGS. 2 & 3 illustrate example symbol tables raised from provided source code. Referring now to FIG. 2, an example symbol mapping is illustrated for the following code:

```
var g;
function foo(p) {
    var v;
}
```

The example demonstrates raising symbols from a variable declared at global scope ('g'), a function 'foo' also declared at global scope, a parameter 'p' (the scope of which is constrained to function 'foo') and a local variable 'v', also constrained in scope to 'foo'. The illustration shows the hierarchical relationship of these symbols. Referring now to FIG. 3, an example symbol mapping is illustrated for the following code

```
var g = {
    a: null,
    b: null
};
function foo(p) {
    var v = {
        c: null
    };
}
```

Additional details are now illustrated. It should be appreciated that while the following examples illustrate specific types, functions, etc., other embodiments may use similar or equivalent types, functions, etc. In particular, naming strategies should not be considered limiting, but rather are used for concreteness and illustration. Illustrating now further details, a first parser pass illustrating general AST 106 and hierarchical symbol table 102 construction is illustrated. In the first pass, a set of inputs is identified, either explicitly (for example, using a command-line provided by a user or a program project file maintained in an integrated development environment) or implicitly (for example, by scanning product source code 104, making assumptions about a runtime execution environment, inferring dependencies from in-source information such as links to JavaScript, XML doc comments, etc).

Figure 4:
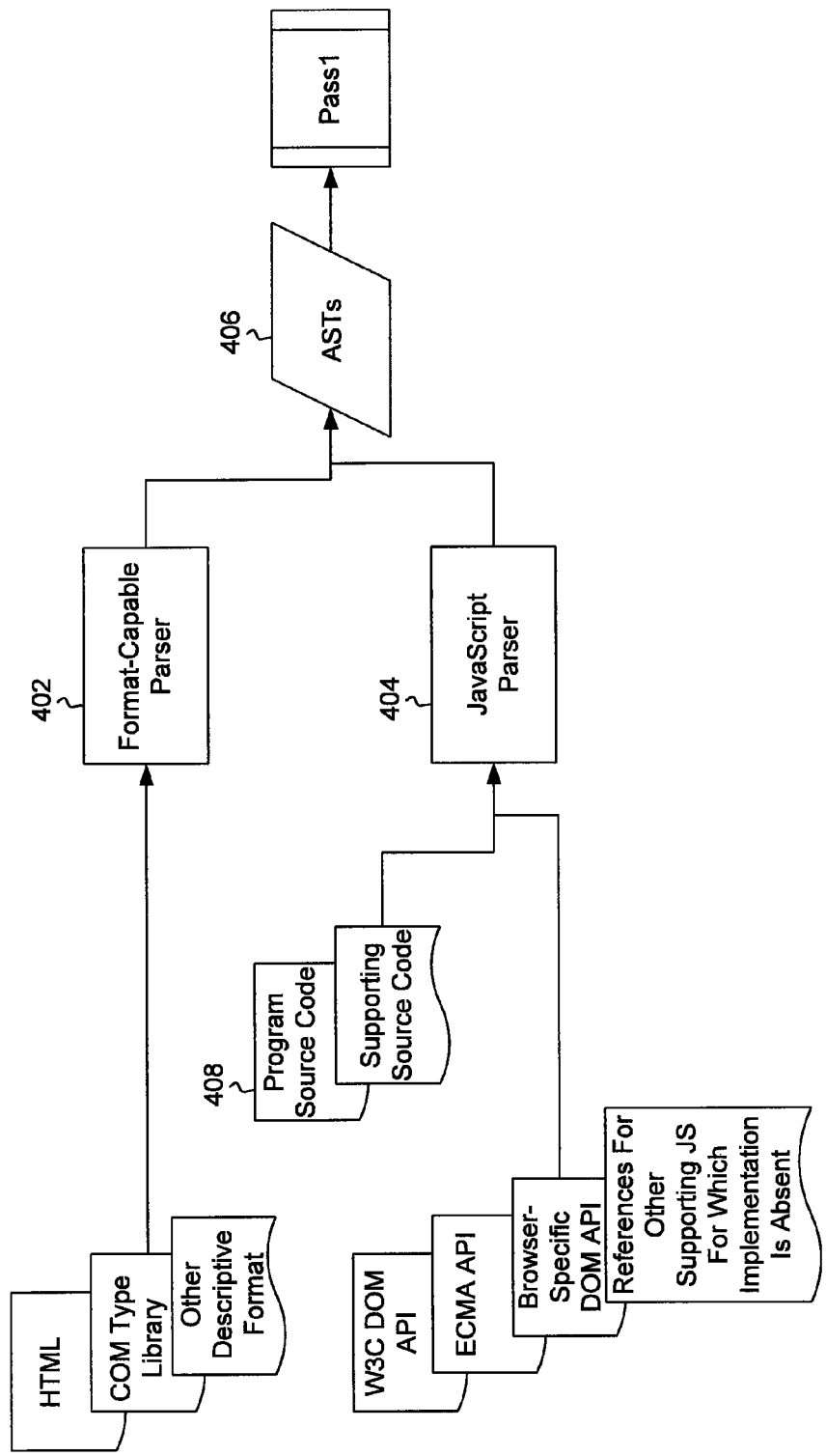
FIG. 4 illustrates parsers used for parsing code into one or more abstract syntax trees.

Referring now to FIG. 4, a specific example of tools used to analyze JavaScript applications are illustrated. While FIG. 4 illustrates a specific JavaScript example, it should be appreciated that other embodiments can use similar elements for other dynamic bodies of source code. FIG. 4 illustrates two parsers, a format-capable parser 402 and a JavaScript parser 404. The parsers can parse various bodies of computer code to produce ASTs 406, such as the AST 106 illustrated in FIG. 1.

Embodiments can include source code which falls, in some examples, into one of three categories: 1) product code, 2) other supporting 'framework' code, and 3) other supporting 'reference' code, all of which is represented by the body of source code 104 illustrated in FIG. 1. The JavaScript parser 404 is able to parse product code or program source code 408. Product code refers to the source code that comprises the user source, which is typically the target of the analysis (i.e., the source code for which useful information or functionality is raised against). The JavaScript parser 404 may also parse supporting source code 410. Supporting source code 410 may include source code that facilitates execution of the program source code. For example, supporting source code 410 may include framework source code. In general, supporting source code may be code that is not part of a particular program, but that can be used to provide more information about the program. For example, supporting source code may be one or more declarations of types. Supporting 'framework' code, refers to code that also executes at runtime but which is picked up from the system, other 3rd-parties, or which simply should not be regarded as of primary interest in the current scenario. Supporting 'reference' code, refers to augmenting information which happens to be rendered in the format of the dynamic language (because this is convenient, both for tooling and for maintenance by developers). 'Reference' code is consumed by the tool only, it is not executed at runtime.

Input files may be read sequentially and abstract syntax trees 106 created for them. The ASTs 406 are subsequently traversed and a hierarchical symbol table (such as the symbol table 102 illustrated in FIG. 1) is constructed from them that expresses scoping of all discovered symbols. Symbols for functions are constructed in this phase.

A pass subsequent to the first pass may be performed to accomplish type inferencing and member population. During the subsequent pass, types are resolved as far as possible. In some embodiments, types may be resolved, for example, by inference and check. Also during the subsequent pass member symbols are populated. This subsequent pass is not performed in sequential order. The following illustrates heuristics used to determine the order in which the code is analyzed. Global code is analyzed first. Functions (both declarations and function expressions) are queued up for execution, and ceteris paribus will be analyzed in the same order they were found after all global code has been analyzed. A call to a function will cause it to be analyzed ad hoc, being removed from the queue, if present, or added to it if not. When performing the latter step, 'Miranda' prototyping rules are used, meaning that if the types of the parameters to a function are not known, they will be supplied by the known types of the arguments at the first function call point.

In the following description, much of the descriptive information is specific to JavaScript. However, it should be noted that these examples are merely illustrative and other embodiments may be used with other languages. Type inferencing is performed in a bottom-up fashion. As the parser 108 recursively walks the AST 106, it bubbles up types for sub-expressions recursively and applies rules to infer type expressions whose type is unknown. The following illustrate rules that may be applied. Literals (Boolean values, strings, numbers, null, objects, arrays) denote their own type. Identifiers that refer to functions are of type Function. Identifiers that refer to symbols whose types have been inferred are of the same type as the symbol to which they refer. Additive expressions are of type String if either operand is a String, in which case both sides are inferred to be of type String. Other additive expressions and all other arithmetic expressions (both binary and unary) are of type Number, and their operands are inferred to be of type Number. Boolean expressions (both binary and unary) are of type Boolean, and their operands are inferred to be of type Boolean. Function call expressions are of the same type as the function being called has been inferred to return. "New" expressions are of the type designated by the function used in the new expression. Return statements cause the current function to be inferred to return the type of the return expression. Control flow statements (for loops, ifs, switches, returns, etc.) are of type "void" (or "undefined" in JavaScript). For inference rules above, it is possible to use annotations (see below) to explicitly define types.

In some embodiments, functions are categorized into one of four categories, i.e.: unknown, static functions, member functions, or constructors. A function may be initially unknown and is categorized based on usage. A function called directly is considered static. A function called through on an object instance is the objects member function. A function used in a new expression is marked as a constructor. As with types, the annotations mechanism can also impact categorization of functions.

Illustrating now a particular special case, JavaScript includes a keyword 'this.' The 'this' keyword refers to the execution context of a function, which can differ for each function call. The resolution of 'this' in JavaScript is dependent on runtime information complicating performance of a complete static analysis. Embodiments may use a number of now illustrated heuristics to determine to what a reference to 'this' refers. If the context is global code or if the function is static or unknown, then 'this' evaluates to a symbol that represents the global scope (e.g., the "window" object in browsers). If the context is a constructor, then 'this' evaluates to a prototype object of the function it represents. If the context is a function being assigned to an object member, then 'this' evaluates to the object. If the context is a member function, then 'this' evaluates to the prototype of the function that declares the type of the member on which this function is being called. It is possible to use language augmentations (annotations) to describe the binding of the function and override the above heuristic rules.

For property accessors, the type of the left-hand side expression is evaluated and the right-hand side identifier is sought in the symbol table, following the relevant type's prototype chain.

Some embodiments may implement or support direct symbol hydration and symbol hydration with alternate parsers. Embodiments may provide a mechanism for directly populating the symbol table 102 based on parsing inputs other than literal source code that will execute at runtime. In one illustrative example, the JavaScript parser 404 may further include functionality for parsing application programming interface (API) code. For example, FIG. 4 illustrates the JavaScript parser 404 parsing API code for W3C APIs, ECMA APIs, and browser-specific Document Object Model (DOM) APIs. W3C DOM API, ECMA(X) API (such as Math functions), JavaScript API, COM objects, browser-specific API, browser specific DOM extensions, etc, can be expressed as (generally bodiless) JavaScript functions/variables that are passed to the AST analyzer described above. The JavaScript parser 404 may further include functionality for parsing reference code for other supporting JavaScript for which implementation is absent. This may be functionality (functions, types, etc.) that are assumed to be available during runtime, but are not part of the program. Reference code refers to metadata sufficient to model symbolic references which cannot be computed and/or inferred from production code. This may include the body of executable API that is provided as built-in browser/ECMA script functionality (such as the HTMLElement class and JS Math functions). This may include 'foreign' api that model code which is callable due to some interop mechanism (such as calling into a COM object or a web service). Reference code may include 'type definitions' which are superimposed onto production code but which are otherwise irrelevant at runtime. In a reference file, for example, embodiments may include a description for a type that includes only two methods, foo and bar. In a product file, a parameter may be annotated as being of this type. At analysis time, embodiments can ensure that only methods named foo or bar are called on that parameter.

The format-capable parser 402 is configured to parse HTML, COM type libraries, and other descriptive formats as now described in more detail. APIs that are 'foreign' to the language/runtime (i.e., for which some sort of special interop code is required to execute at runtime, e.g., COM objects) can be added to the symbol table by parsing relevant descriptive formats (such as type libraries) and/or these descriptions can be converted to a format (such as in the particular illustrated example, JavaScript) which can be fed directly to the symbol table construction code. The system can accept static (such as user-authorable) descriptions of symbols as well as extensions that parse arbitrary data formats and populate the symbol table accordingly. An example of the latter is an extension that parses HTML to populate the symbol table with DOM elements expressed in mark-up that are accessible to JavaScript code (such as calls to getElementsById). There is some tolerance in the system for errors and/or incompleteness of reference data as distinct from production code (which will be modified and/or analyzed within the editor).

Some embodiments may implement or facilitate extensions that model runtime symbol construction. Embodiments may provide a mechanism for populating the symbol table not merely with code as it is analyzed but, in some cases, based on the result at runtime when executing that code. Some useful examples relate to JavaScript utility code that constructs and populates object instances with members. Ecma5 JavaScript provides helpers such as object.createProperty which can, in some cases, be modeled by the system. String literals passed to eval can be parsed into AST and injected into the AST and/or symbol table.

Some embodiments may benefit from constraining development practices to maximize code discoverability. There are typically a set of coding guidelines/practices that have a high return as far as helping with the ability of embodiments to function with a correspondingly low impact on the expressiveness and/or utility of the dynamic language. One example of such a constraint is directing developers to avoid use of eval statements in JavaScript. In some embodiments, these constraints may be enforced by coding tools which prevent developers from violating constraints, or at least warn a developer if they are about to break or exceed a constraint.

Embodiments may include a mechanism for reporting conditions to users that limit the ability to analyze source. In particular, there may arise situations in which dynamic source code cannot be completely analyzed and/or all symbols resolved. Embodiments can include functionality to indicate such to developers when such conditions arise.

Using the symbol table, embodiments may implement a number of other functionalities. For example, embodiments may implement various editor features such as one or more of 'go to symbol definition', 'find all references to this symbol', 'rename this variable and all references to it', etc.

Embodiments may include functionality to create or use an ability to display a representation of implicitly available API, for informational purposes and to potentially serve as both the target for 'go to reference' or the source for 'find all references to this symbol' features.

Embodiments may include functionality to create or use a mechanism for modeling symbol construction based on analyzed code. Embodiments may include call sites to an API that constructs a class object based on a set of input parameters. For example, input parameters could be transformed into symbols that represent actual objects as they will be available at runtime, based on analyzed code.

Embodiments may include functionality to create or use a mechanism for specifying, authoring/edited descriptive inputs representing symbol tables entries, in formats such as XML, native JavaScript, etc. This may also include the ability to parse HTML to identify runtime-available objects. For example embodiments may be able to identify elements marked with a specific identifier (such as an HTML 'id' attribute).

Embodiments may include functionality to create or use an ability to annotate source code with 'type' information. This may allow embodiments to jump to a type or object definition that might exist as actual project source or is solely represented in generated code and/or static descriptive input files.

Embodiments may include functionality to create or use an ability to annotate source code files with (or otherwise associate) a set of dependencies (such as another supporting JavaScript file) used to construct a comprehensive symbol space for analysis.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
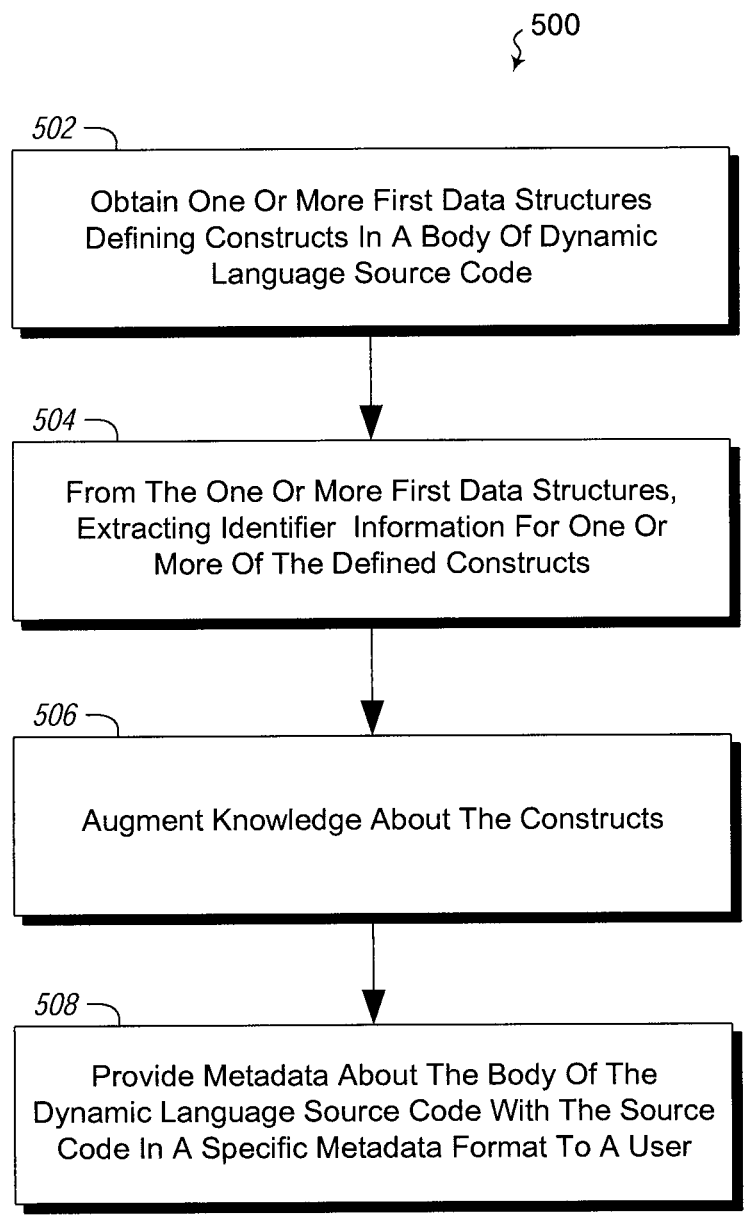
FIG. 5 illustrates a method of creating metadata for dynamic code.

Referring now to FIG. 5, a method 500 is illustrated. The method 500 may be practiced in a computing environment. The method 500 includes acts for creating metadata for dynamic code in a descriptive metadata language. The method includes obtaining one or more first data structures defining constructs in a body of dynamic language source code (act 502). For example, in some embodiments, the one or more first data structures comprise at least one of a syntax tree or an abstract syntax tree. FIG. 1 illustrates a abstract syntax tree 106 derived, at least in part from a body of source code 104. In the example illustrated in FIG. 1, the abstract syntax tree 106 is the specific example of a data structure.

The method 500 further includes, from the one or more first data structures, extracting identifier information for one or more of the defined constructs (act 504). For example, embodiments may extract symbol names into a symbol table.

The method 500 further includes augmenting knowledge about the constructs (act 506). Augmenting knowledge about the constructs can be accomplished in a number of different ways. For example, augmenting may be based on explicit inspection of the body of dynamic language source code. For example, the dynamic language source code may include comments in the code that can be used to augment knowledge about constructs in the code. Explicit inspection of the body of dynamic language source code may include inspection of code that is a surrogate for an actual implementation or which models code that is not explicitly expressed in source code form. For example, this may include cases of dropping in reference files to replace 3rd party frameworks in an analysis tool chain as well as modeling things like built-in DOM API (which have no actual representation as JavaScript source code.

Alternatively or additionally, augmenting may be based on one or more implied inferences. For example, if it can be determined that source code concatenates to a string literal using an object as an operand, it can be determined that the resulting object is a string. If an arithmetic operation is performed using an object as an operand, it can be determined that the object is a numerical type, such as an integer or floating point. Inferences may be may be made based on a framework supporting source code. For example, knowledge about a framework and knowing how that framework will consume source code can facilitate inferring addition information about the source code. Similarly, context can be used to infer additional information. For example, context such as a browser which source code will be used with and knowing how that browser will interact with source code can facilitate inferring addition information about the source code. Further still, stand in code can be used to make inferences to augment knowledge about source code. Stand-in code provides an alternate body (that is, implementation) of a function that is expressly designed to assist in computing symbolic information for variables that are within scope (as opposed to being intended to execute at runtime). This is an alternate approach to analyzing the actual implementation of a function to acquire information or depending strictly on annotations.

Embodiments could be implemented that include augmentation as a result of folding in runtime collected data. In particular, embodiments may instrument the runtime to provide information about how the type of set of types that a parameter resolved to at a specific code location. This new information may be folded into the augmented information.

Embodiments could be implemented that include augmentation as a result of modeling the results of executing code. For example, embodiments of the method 500 may be performed where augmenting includes modeling the effects upon a symbol table that would result from executing a call to one or more functions based on explicit, inferred or computed call site details. For example, assume that an embodiment has knowledge of a function constructNamespace(namespaceName), which creates a global object of the name that is passed in as an argument. During analysis, when embodiments observe a call site constructNamespace("My.Namespace"), the tool could add the specified namespace object to the symbol table so that it is subsequently available when processing the remainder of the function. Other embodiments may implement a more complicated path analysis to calculate a number of possible paths through the function, with implied arguments provided to a callee. For example, embodiments may implement symbolic execution, abstraction interpretation, control and data flow analysis, etc.

Alternatively or additionally, augmenting may be based on user input. For example a user interface using a command line tool and/or graphical based tool may be used to augment the body of dynamic language source code. For example, a user can provide additional information about objects in code, similar to how commenting might work, but without needing to formally comment the source code. Rather, the tool may be used to allow a user to make external comments about source code.

The method 500 further includes providing metadata about the body of the dynamic language source code with the source code in a specific metadata format to a user (act 508). For example, and as illustrated previously, the specific metadata format may include a symbol table.

The following now illustrates details of using the symbol table to perform code transformations. Some code transformations are possible by matching the input AST 106 against the symbol table 102 (See FIG. 1). Some transformation may include obfuscation, minification, optimization, code partitioning, lambda lifting, or translation into a different computer language. It should be noted however, that this list is non-exhaustive, as many other transformation are possible. These, however, are instructive.

Illustrating now additional details, transforming code may include performing obfuscation operations on the code. For example, code transformation is sometimes intended to protect intellectual property by obscuring source and increasing the difficulty of reusing it outside of its published context. Thus, obfuscation can make source code harder to read, for example by transforming naming conventions in obscure ways and/or redoing formatting to make it more difficult for a human to read. For example, a user may access a web page. The user may then select a view source selection common on many browsers to view the source code responsible for rendering the page. However, using obfuscation techniques, intuitive naming conventions and/or formatting can be replaced with generic naming and unintuitive formatting. In particular, using the symbol table, a search and replace operation can be performed to replace all instances of an intuitively named symbol with a generic name, or to change formatting within a body of source code.

Transforming code may include performing minification operations on the code. Transforming source code for dynamic languages, particularly those that target the web, such as JavaScript, can be done for performance reasons, to reduce download size. Minification operations can be used to accomplish this functionality. For example, using the symbol table, search and replace operations may be performed to find long symbol names and to make them shorter. This results in a smaller body of source code with respect to transmission or storage size of a body of code. This can be used to reduce download time for rendering a web page, reduce cache sizes needed to store web pages, and for other functionality. Some minification embodiments may be performed where transforming code includes determining, based on analysis of the symbol table, that a function will not be called and removing code for the function. Other minification embodiments may be performed where transforming code includes determining, based on additional semantic analysis, that a conditional statement might always resolve to a constant value at runtime and removing other code paths which are therefore determined to not be callable.

Transforming code may include performing code refactoring operations on the code. Generally, code refactoring includes taking code from one location in a body of source code and putting it at another location in the body of source code. Transforming may include changing the structure of the code.

Embodiments may be implemented where performing code refactoring includes code partitioning. For example, code may be split into smaller discrete portions. It may be useful to have smaller discrete portions of code so that less code may be delivered to a user to better utilize transmission resources or storage resources. For example, a user may not need an entire body of source code immediately to view a particular portion of a web page or web site. The portions of the code needed for viewing a portion of interest can be transmitted to a user while reserving other portions for later when needed or when transmission resources (such as network resources) are more available. Using the symbol table, related code can be identified, such as for example identifying dependencies between symbols. The code can be partitioned on a dependency basis or other suitable basis. Various bases for determining portioning can be identified by using the symbol table.

Embodiments may be implemented where performing code refactoring includes performing lambda lifting. Lambda lifting includes a processes whereby nested functions and/or non-global function (i.e. local functions) are promoted to first level functions and may include an extra parameter to replace local variables. The symbol table may be used to identify such functions and to facilitate the rescoping of such functions.

Transforming code may include performing optimization on the code. In particular, the code can be transformed into different code, but where, from the perspective of the user, the different code functions in the same way as the original code. The transformed code acts as an optimized black box of the original code.

Transformation scenarios are very much like the passes discussed previously herein. They each take an AST produced by the previous stage, and generate a new AST, which will be consumed by the next stage. Also, they read from and potentially write to the global data structures.

Embodiments may provide an extensibility mechanism where new analysis scenarios and/or transformation scenarios can be designed by 3rd parties.

When performing the transformation, the module currently executing will detect certain patterns or conditions as it walks the AST 106, and it will modify the AST 106 (and update the global data structures—for example, the symbol table 102) to achieve its goals. Notably, while an AST 106 has been illustrated in the above examples, it should be appreciated that other types of symbol trees may be used alternatively or additionally.

To illustrate how transformation works, an example of how an optimizer might work is illustrated. Consider the following script:

```
var v1, v2;
v1 = 1;
v2 = v1 + 4;
alert(v2);
```

Figure 6A:
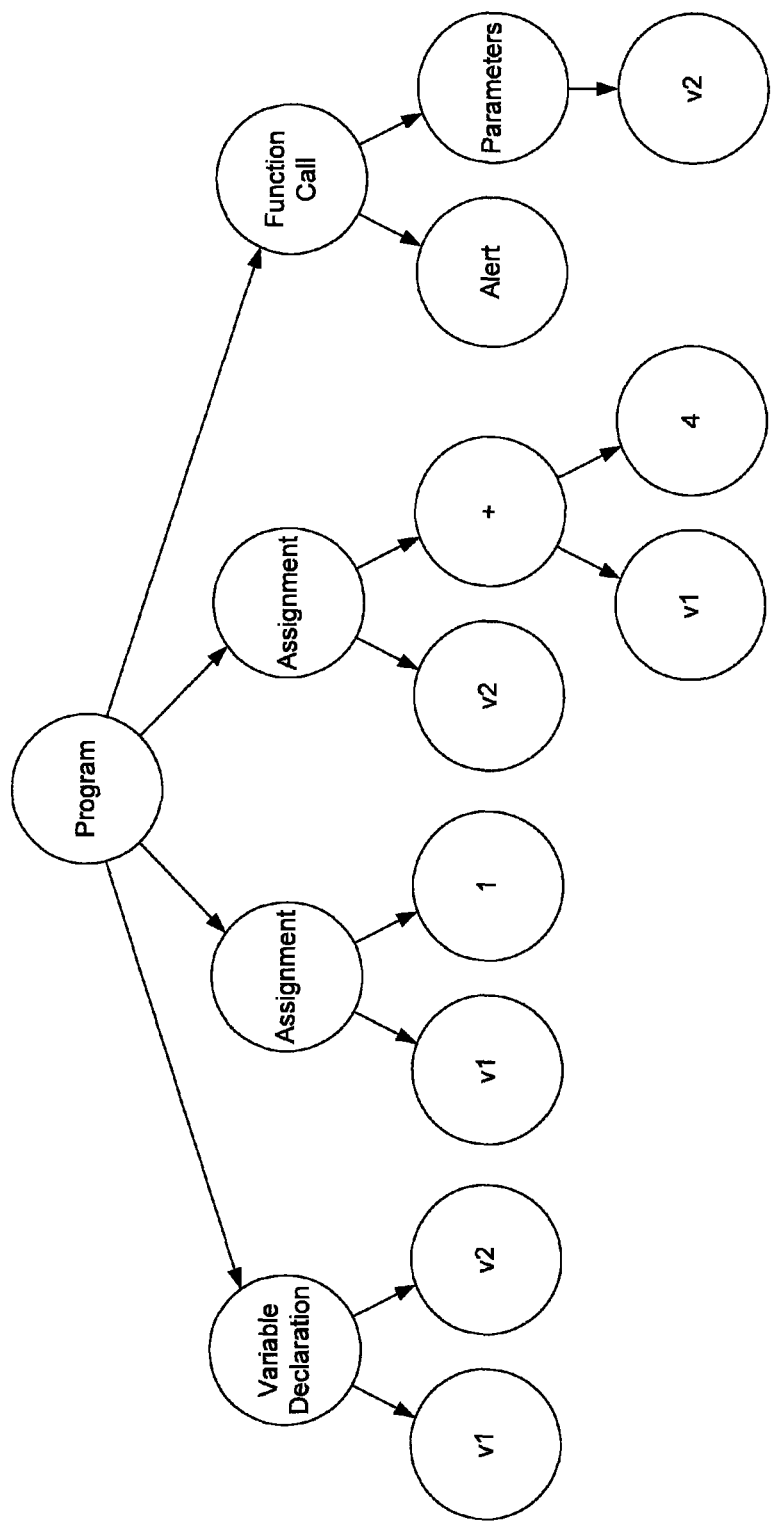
FIG. 6A illustrates an abstract syntax tree.

An example AST for this example is shown in FIG. 6A. Now consider a very simple optimizer that has the following set of rules (checked as it recursively walks through the AST):
1. If current node is a variable declaration, and variable is only ever assigned to once, then verify the assignment to see if it's constant. If so, remove variable declaration from AST and mark the symbol as being constant. Also, remove assignment from AST and store the assignment value as the symbol value.
2. If current node is an assignment, verify expression on the right.
3. If current node is an arithmetic or logical operator (addition, subtraction, etc.), then this expression is constant if both operands are constant. In that case, remove node from AST and replace it with its value.
4. If current node is a value literal (string, number, Boolean value, null, etc.), then it is constant.
5. If current node is a variable, it is constant if and only if its symbol has been marked as constant. If so, replace the AST node with its value.

Figure 6B:
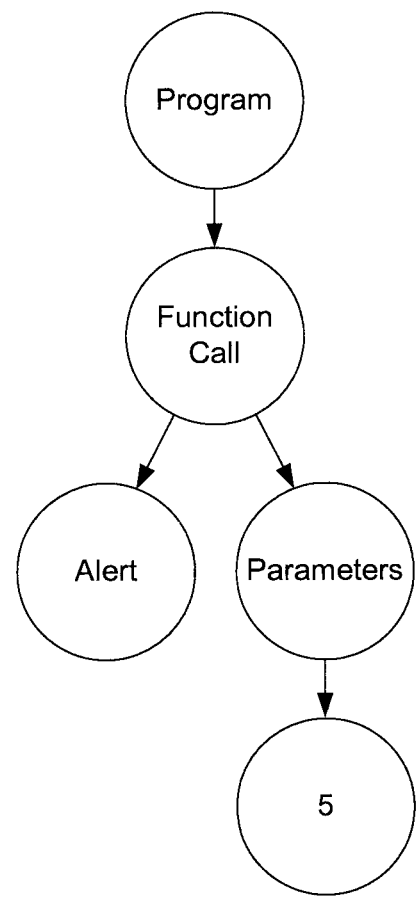
FIG. 6B illustrates a transformed abstract syntax tree.

In the example above, embodiments assume earlier passes counted how many times a variable was assigned to, and maintained that count, along with the assignment point, in some data structure consumable by the optimizer. After the optimizer above has run, the modified AST would look like the example shown in FIG. 6B. The generated output file would then look like the following, instead of the original input:
alert(5);

This optimizer was a very simple example of a module that transforms the AST.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
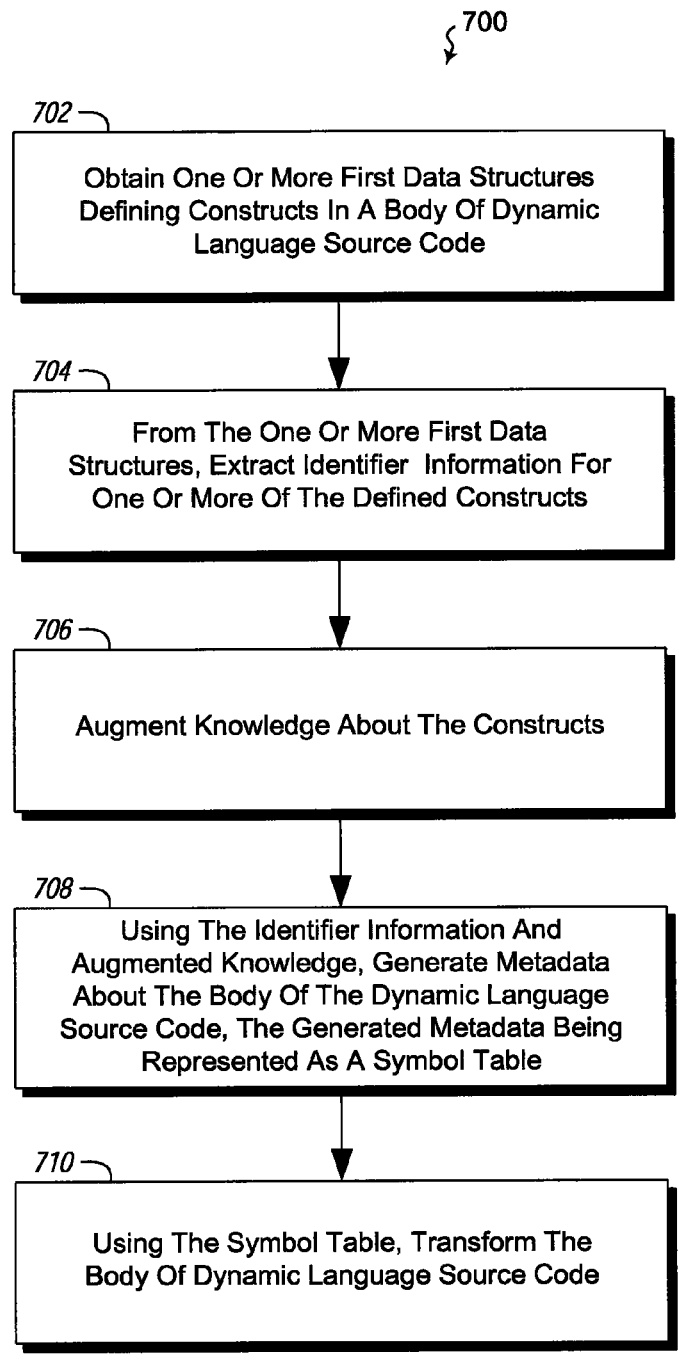
FIG. 7 illustrates a method of transforming source code.

Referring now to FIG. 7, a method 700 is illustrated. The method 700 may be practiced in a computing environment. The method includes acts for transforming dynamic code. The method includes obtaining one or more first data structures defining constructs in a body of dynamic language source code (act 702).

The method 700 further includes from the one or more first data structures, extracting identifier information for one or more of the defined constructs (act 704)

The method 700 further includes augmenting knowledge about the constructs (act 706)

The method 700 further includes using the identifier information and augmented knowledge, generating metadata about the body of the dynamic language source code, the generated metadata being represented as a symbol table (act 708)

The method 700 further includes using the symbol table, transforming the body of dynamic language source code (act 710)

The method 700 may be practiced where transforming the body of dynamic language source code comprises performing obfuscation operations on the code. As described above, this can be done to make source code harder to read. For example naming can be done in obscure ways and/or formatting can be redone to make the code more difficult for humans to read.

The method 700 may be practiced where transforming the body of dynamic language source code comprises performing minification operations on the code. For example, long names can be made shorter.

The method 700 may be practiced where transforming the body of dynamic language source code comprises performing optimization on the code. Optimization may include creating different code from the source code, but where the code has the same functionality from the perspective of the user. An optimized "black box" can be created. Optimizations may discard code that will never be called at runtime to increase performance. Optimizations may create shims to actual production code so that one is able to refactor code and obtain flexibility by allowing consumers to bind to a static description of an API.

The method 700 may be practiced where transforming the body of dynamic language source code comprises performing code refactoring operations on the code. Refactoring may include taking code from one place and putting it somewhere else. Alternatively or additionally, refactoring may include changing the structure of a body of code. Code refactoring may include code partitioning. Partitioning may include splitting code into smaller portions for downloading. Code refactoring may include lambda lifting where nested non global functions are promoted to first level functions.

The method 700 may be practiced where transforming the body of dynamic language source code comprises performing dead code removal, including determining that a function will not be called and removing code for the function.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of transforming dynamic code, the method comprising:
    parsing one or more first data structures to generate one or more syntax trees defining constructs in a body of dynamic language source code;
    from the one or more syntax trees, extracting identifier information for one or more of the defined constructs;
    augmenting knowledge about the constructs by at least one of explicit inspection of the body of the dynamic language source code or implied inferences related to the dynamic language source code, wherein augmenting comprises modeling the results of executing the dynamic language source code including symbolic execution, abstraction interpretation, and control and data flow analysis;
    producing a correlation between identifiers and augmented knowledge;
    using the identifier information and augmented knowledge, generating metadata about the body of dynamic language source code, the generated metadata being represented as a symbol table;
    traversing the one or more syntax trees to construct a hierarchical symbol table that expresses scoping of all discovered symbols of the dynamic language source code; and
    using the hierarchical symbol table, transforming the body of dynamic language source code comprising performing code refactoring including code partitioning to identify and rescope the discovered symbols of the dynamic language source code.

2. The method of claim 1, wherein transforming the body of dynamic language source code comprises performing obfuscation operations on the dynamic language source code.

3. The method of claim 1, wherein transforming the body of dynamic language source code comprises performing minification operations on the dynamic language source code.

4. The method of claim 1, wherein transforming the body of dynamic language source code comprises performing optimization on the dynamic language source code.

5. The method of claim 1, wherein performing code refactoring further comprises lambda lifting.

6. The method of claim 1, wherein transforming the body of dynamic language source code comprises performing dead code removal, including determining that a function will not be called and removing code for the function.

7. A computer program product comprising one or more computer readable storage media comprising computer executable instructions that when executed by one or more processors cause one or more processors to perform the following:
    parsing one or more first data structures to generate one or more syntax trees defining constructs in a body of dynamic language source code;
    from the one or more syntax trees, extracting identifier information for one or more of the defined constructs;
    augmenting knowledge about the constructs by at least one of explicit inspection of the body of the dynamic language source code or implied inferences related to the dynamic language source code, wherein augmenting comprises modeling the results of executing the dynamic language source code including symbolic execution, abstraction interpretation, and control and data flow analysis;

producing a correlation between identifiers and augmented knowledge;

using the identifier information and augmented knowledge, generating metadata about the body of dynamic language source code, the generated metadata being represented as a symbol table;

traversing the one or more syntax trees to construct a hierarchical symbol table that expresses scoping of all discovered symbols of the dynamic language source code; and using the hierarchical symbol table, transforming the body of dynamic language source code comprising performing code refactoring including code partitioning to identify and rescope the discovered symbols of the dynamic language source code.

8. The computer program product of claim 7, wherein transforming the body of dynamic language source code comprises performing obfuscation operations on the dynamic language source code.

9. The computer program product of claim 7, wherein transforming the body of dynamic language source code comprises performing minification operations on the dynamic language source code.

10. The computer program product of claim 7, wherein transforming the body of dynamic language source code comprises performing optimization on the dynamic language source code.

11. The computer program product of claim 7, wherein performing code refactoring further comprises lambda lifting.

12. The computer program product of claim 7, wherein transforming the body of dynamic language source code comprises performing dead code removal, including determining that a function will not be called and removing code for the function.

13. In a computing environment, a system for transforming dynamic code, the system comprising:
one or more processors;
one or more computer readable media coupled to the one or more processors, wherein the one or more computer readable media comprise computer executable instruction that when executed by one or more of the one or more processors cause one or more of the one or more processors to perform the following:
parsing one or more first data structures to generate one or more syntax trees defining constructs in a body of dynamic language source code;
from the one or more syntax trees, extracting identifier information for one or more of the defined constructs;
augmenting knowledge about the constructs by at least one of explicit inspection of the body of the dynamic language source code or implied inferences related to the dynamic language source code, wherein augmenting comprises modeling the results of executing the dynamic language source code including symbolic execution, abstraction interpretation, and control and data flow analysis;
producing a correlation between identifiers and augmented knowledge;
using the identifier information and augmented knowledge, generating metadata about the body of dynamic language source code, the generated metadata being represented as a symbol table;
traversing the one or more syntax trees to construct a hierarchical symbol table that expresses scoping of all discovered symbols of the dynamic language source code; and
using the hierarchical symbol table, transforming the body of dynamic language source code comprising performing code refactoring including code partitioning to identify and rescope the discovered symbols of the dynamic language source code.

14. The system of claim 13, wherein transforming the body of dynamic language source code comprises performing obfuscation operations on the dynamic language source code.

15. The system of claim 13, wherein transforming the body of dynamic language source code comprises performing minification operations on the dynamic language source code.

16. The system of claim 13, wherein transforming the body of dynamic language source code comprises performing optimization on the dynamic language source code.

* * * * *